(12) United States Patent
Elferich (10) Patent No.: US 9,163,815 B2
(45) Date of Patent: Oct. 20, 2015

(54) POWER CONVERTER DEVICE FOR DRIVING SOLID STATE LIGHTING LOAD

(75) Inventor: Reinhold Elferich, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 299 days.

(21) Appl. No.: 13/996,579

(22) PCT Filed: Dec. 13, 2011

(86) PCT No.: PCT/IB2011/055647
§ 371 (c)(1),
(2), (4) Date: Jun. 21, 2013

(87) PCT Pub. No.: WO2012/085759
PCT Pub. Date: Jun. 28, 2012

(65) Prior Publication Data
US 2013/0271021 A1    Oct. 17, 2013

Related U.S. Application Data

(60) Provisional application No. 61/425,806, filed on Dec. 22, 2010, provisional application No. 61/441,484, filed on Feb. 10, 2011.

(51) Int. Cl.
| | |
|---|---|
| H05B 39/00 | (2006.01) |
| F21V 23/02 | (2006.01) |
| H02M 1/42 | (2007.01) |
| H05B 33/08 | (2006.01) |

(52) U.S. Cl.
CPC ............. *F21V 23/02* (2013.01); *H02M 1/4258* (2013.01); *H05B 33/0809* (2013.01); *H05B 33/0815* (2013.01); *H05B 33/0818* (2013.01); *Y02B 20/348* (2013.01); *Y02B 70/126* (2013.01)

(58) Field of Classification Search
None
See application file for complete search history.

(56) References Cited

U.S. PATENT DOCUMENTS

| | | | |
|---|---|---|---|
| 6,016,038 A | 1/2000 | Mueller et al. | |
| 6,184,630 B1 * | 2/2001 | Qian et al. | ............ 315/224 |
| 6,211,626 B1 | 4/2001 | Lys et al. | |
| 7,035,071 B1 | 4/2006 | Tiew et al. | |
| 2007/0040516 A1 | 2/2007 | Chen | |
| 2009/0146575 A1 | 6/2009 | Chu et al. | |

(Continued)

FOREIGN PATENT DOCUMENTS

CN          201365204 Y     12/2009

OTHER PUBLICATIONS

Z. Mohamed et al; "A Universal Single-Stage AC-DC Front-End Resonant Converter With a New Active Current Mode Controller: Performance and Design", 2007, SC 1, 2 & 4, pp. 790-792.

(Continued)

*Primary Examiner* — Long Nguyen
(74) *Attorney, Agent, or Firm* — Yuliya Mathis (57) ABSTRACT

A power converter device for converting power from a mains power supply (201) to power a solid state lighting load (280) includes a converter (230) and a control circuit (350). The converter (230) includes a half-bridge inverter (220) that functions as a boost inverter and output stage inverter, the half-bridge inverter having multiple switches (221, 222). The control circuit (350) is configured to control a mains input current and an output current of the device independently by providing a switching signal (S_HB) to the switches in the half-bridge inverter, where the switching signal has a duty cycle, a frequency and a cycle skipping duty cycle.

18 Claims, 4 Drawing Sheets

(56) References Cited

U.S. PATENT DOCUMENTS

2009/0316442 A1    12/2009  Elferich
2011/0267844 A1*   11/2011  He et al. .................. 363/21.02
2013/0127358 A1*    5/2013  Yao ............................. 315/201

OTHER PUBLICATIONS

Hung-Liang Cheng et al; "A Novel Single-Stage High-Power-Factor High-Efficiency AC-To-DC Resonant Converter", IEEE 2nd Intnl Power and Energy Conf., 2008, Dec. 1, 2008, pp. 1135-1140, XP002681739.

H.L. Cheng et al; "A Novel Single-Stage High-Power-Factor Electonic Ballast With Symmetrical Topology", Intnl Symposium on Ind. Electronics, Proceedings, ISIE 2001, IEEE, vol. 1, Jun. 12, 2001, pp. 30-35, XP002681734.

A. Ruiz et al; "Half-Bridge Boost Rectifier as Power Factor Corrector-Electronic Balast", Intnl Power Electronics Congress, Oct. 15, 2000, pp. 136-141, XP002681735.

* cited by examiner

POWER CONVERTER DEVICE FOR DRIVING SOLID STATE LIGHTING LOAD

TECHNICAL FIELD

The present invention is directed generally to power conversion for solid state lighting load. More particularly, various inventive methods and apparatus disclosed herein relate to a power converter having a half-bridge inverter that functions as an integrated mains rectifier, boost inverter and output stage inverter, and provides power factor correction with respect to a solid state lighting load.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green and blue, as well as a processor for independently controlling the output of the LEDs in order to generate a variety of colors and color-changing lighting effects, for example, as discussed in detail in U.S. Pat. Nos. 6,016,038 and 6,211,626.

Typically, an LED-based lighting unit or LED load that includes multiple LED-based light sources, such as a string of LEDs connected in series, is driven by a power converter, which receives voltage and current from mains power supply. There is a variety of power converters that have integrated power factor correction ("PFC"), particularly in connection with fluorescent ballasts. Generally, power converters may be divided into two groups. The first group includes power converters that feed back part of inverted power to the rectified mains power supply to shape the mains input current. This is accomplished based on feed back current and/or voltage. The second group includes power converters having relatively straightforward integration, in which a boost or buck-boost inverter is combined with an output stage inverter. The output stage may be a resonant type or a buck derived converter.

With respect to the power converters in the second group, duty cycle of the rectified input voltage is modulated only to control output current. Such power converters only provide coverage of narrow load ranges. Also, soft switching of a boost inverter is able to occur only in parts of the operational range, or not at all.

Thus, there is a need in the art for a power converter having a half-bridge inverter functioning as an integrated mains rectifier, boost inverter and output stage inverter, and providing power factor correction with respect to a solid state lighting load, and a method of operating the same.

SUMMARY

The present disclosure is directed to inventive devices and methods for providing power conversion to solid state lighting loads, such as LED-based lighting units. More particularly, various inventive methods and apparatus disclosed herein relate to a power converter having a half-bridge inverter that functions as an integrated mains rectifier, boost inverter and output stage inverter, and provides power factor correction with respect to a solid state lighting load.

Generally, in one aspect, a power converter device is provided for converting power from a mains power supply to power a solid state lighting load. The device includes a converter and a control circuit. The converter includes a half-bridge inverter that functions as a boost inverter and output stage inverter, the half-bridge inverter including multiple switches. The control circuit is configured to control a mains input current and an output current of the device independently by providing a switching signal to the switches in the half-bridge inverter, the switching signal having a duty cycle, a frequency and a cycle skipping duty cycle.

In another aspect, a power converter is provided for converting power from a mains power supply to power a light-emitting diode (LED)-based lighting unit, connected to a secondary side of a transformer, to receive an output current from the power converter. The power converter includes a half-bridge inverter, a resonant converter and a control circuit. The half-bridge inverter includes multiple switches. The resonant converter is connected between the half-bridge inverter and a primary side of the transformer. The control circuit is configured to output a half-bridge control signal for selectively activating the switches in the half-bridge inverter to generate a pulsed voltage signal input to the resonant converter, where the half-bridge control signal is a square waveform having a switching duty cycle and a skipping operation duty cycle.

In another aspect, a power converter is provided for converting power from a mains power supply to power an LED-based lighting unit. The device includes a half-bridge inverter and a control circuit. The half-bridge inverter includes multiple switches, and is configured to function as an integrated mains rectifier and output stage, where the output stage includes a resonant capacitor and a transformer. The control circuit is configured to control a mains input current and an output current of the device independently by providing a switching signal to the switches in the half-bridge inverter, the switching signal having a duty cycle, a frequency and a cycle skipping duty cycle corresponding to a cycle skipping operation. The cycle skipping duty cycle is based on comparing multiple difference signals with a corresponding threshold signals, where a first difference signal is a difference between the output current of the device and a reference output current, and a second difference signal is a difference between a resonant capacitor voltage and a reference capacitor voltage.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Generally, Applicants have recognized and appreciated that it would be beneficial to provide a power converter for providing power to a solid state lighting load, such as an LED-based lighting unit, which includes a half-bridge inverter that functions as an integrated mains rectifier, boost inverter and output stage inverter, and provides power factor correction with respect to the solid state lighting load.

In view of the foregoing, various embodiments and implementations of the present invention are directed to a power converter that includes a half-bridge inverter that functions as an integrated (bridgeless) mains rectifier, boost inverter and output stage inverter. In addition, the half-bridge inverter is controlled by a control circuit that controls both the mains input current and the output current (e.g., to a lighting load, such as an LED-based lighting unit or LED load) independently by manipulating a switching signal to the half-bridge inverter. The half-bridge inverter is therefore able to provide power factor correction.

The control circuit includes a state variable watching circuit that directly generates the switching signal using two threshold signals. A first threshold signal is based on the difference between the output current of the power converter and a reference output current, and a second threshold signal is based on the difference between a capacitor voltage measured at a capacitor in a resonant converter of the power converter and a reference capacitor voltage. The reference capacitor voltage is determined from measured mains input voltage, measured bus voltage and a reference duty cycle signal derived from the difference between measured mains input current and a reference mains input current.

More particularly, in an inner control loop of the control circuit, an output current error signal, indicating the difference between the output current of the power converter and the reference output current, controls a threshold difference (differential value). In an outer control loop of the control circuit, an input current error signal, indicating the difference between the mains input current of the power converter and a reference input current, controls a threshold average (common mode value). That is, the input current error signal is used to provide a reference capacitor voltage to be compared to the measured average capacitor voltage. The second threshold signal (i.e., the threshold average) is determined with respect to either ground voltage or to bus voltage, according to the sign of the mains input voltage from the respective mains half-cycle, enabling bridgeless operation. For example, the second threshold signal may be referred to ground at positive mains input voltage and to the bus voltage at negative mains input voltage.

The outer control loop of the control circuit is also configured to switch to a cycle skipping operation in order to keep the bus voltage within preset limits, for example, to avoid "overboosting" for a maximum range of output voltages and currents. For example, the cycle skipping operation may be invoked to compensate for light loads (e.g., deep dimming of the lighting load), where the dimming may be controlled by an external dimming control signal (e.g., 0-10V). That is, the outer control loop of the control circuit causes periodic interruptions, keeping the switching signal in a constant high or low state. The skipping operation is periodic, and thus has a skipping operation duty cycle that is effectively superimposed on the duty cycle of the switching signal. The control circuit may also support operation at and compatibility with wall plug dimmers.

Accordingly, the power converter is able to perform functions of a mains rectifier, a boost converter providing PFC, and an output stage, i.e. a converter that converts bus voltage into output voltage of the LED load. The output stage may include a series parallel resonant converter, which may be an LCC type converter or an LLC type converter with stacked outputs, for example. Unity power factor (PF) operation can be achieved for a range of output voltages and currents. The power converter overcomes problems of resonant converters with integrated PFC regarding limitations of the PF operation in terms of input and output voltage range, as well as output current range, controllability and robustness. It intrinsically supports zero voltage switching (ZVS), and thus allows miniaturization through high frequency power conversion.

Figure 1:
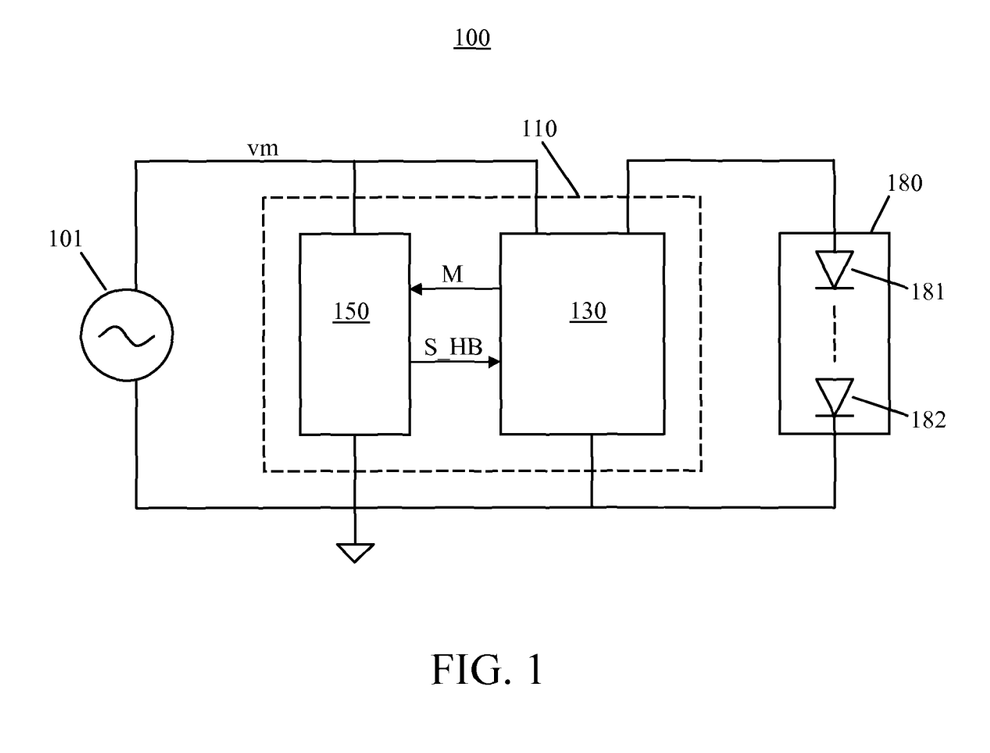
FIG. 1 illustrates a block diagram of a power converter, including a half-bridge inverter and a control circuit, according to a representative embodiment.

FIG. 1 illustrates a block diagram of a power converter, including a half-bridge inverter and a control circuit, according to a representative embodiment.

Referring to FIG. 1, lighting system 100 includes mains power supply 101, power converter 110, and solid lighting fixture 180. The mains power supply 101 may provide different unrectified input AC line voltages, such as 100 VAC, 120 VAC, 230 VAC and 277 VAC, according to various implementations. The solid state lighting load 180 may be an LED-based lighting unit, for example, including a string of LED light sources 181, 182 connected in series.

Figure 2:
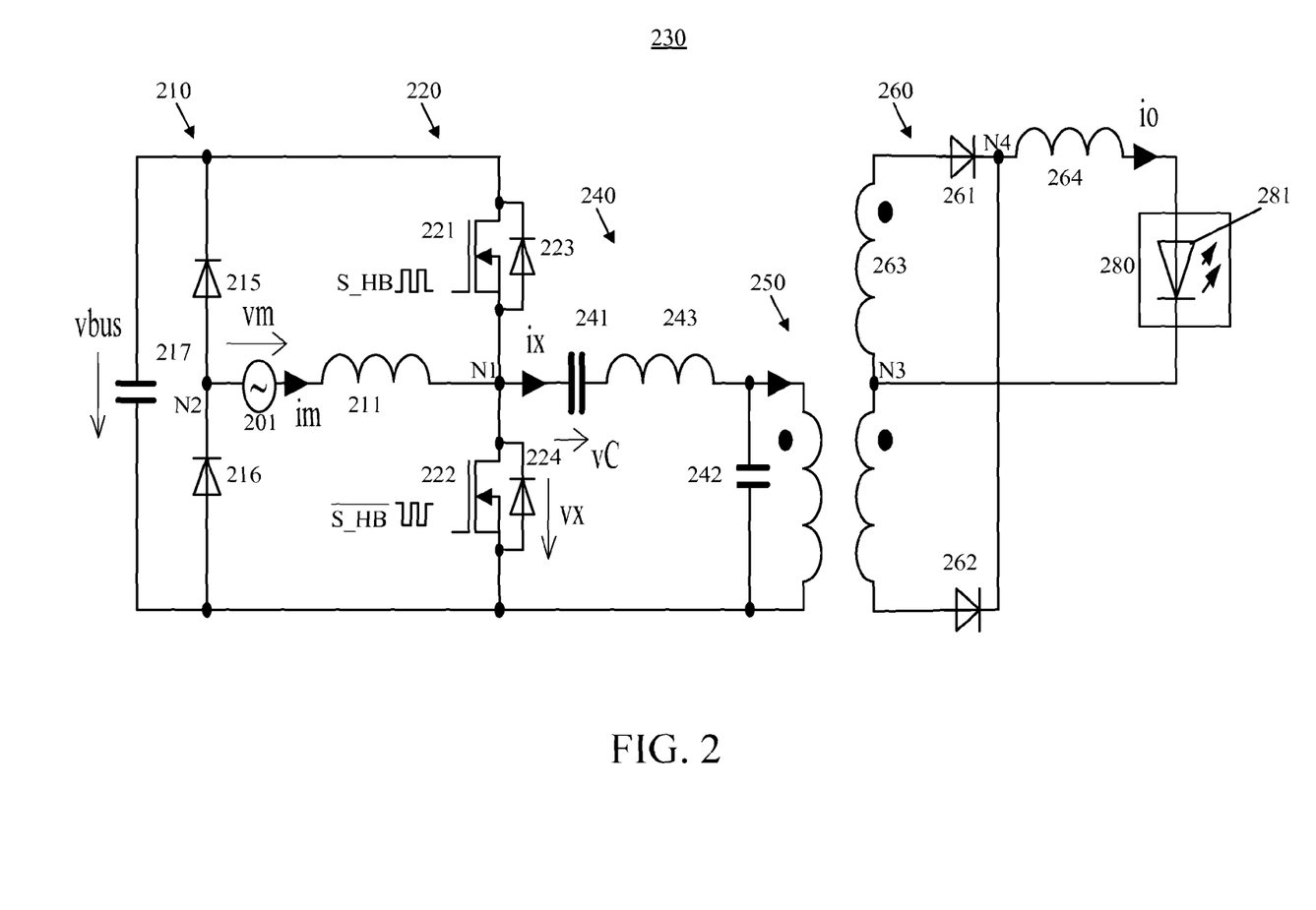
FIG. 2 illustrates a circuit diagram of a power train in a power converter, including a half-bridge inverter, according to a representative embodiment.
Figure 3:
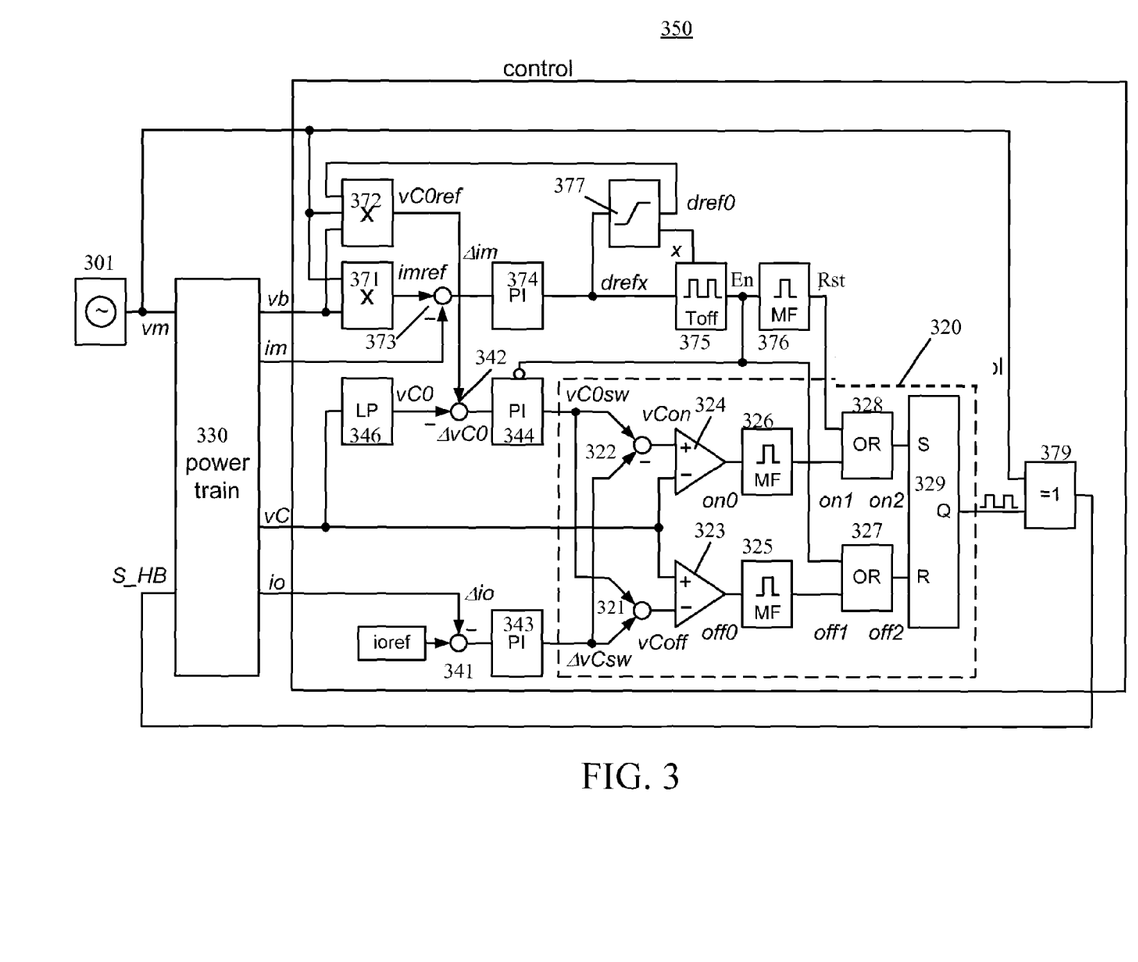
FIG. 3 illustrates a block diagram of a control circuit of a power converter, according to a representative embodiment.
Figure 4:
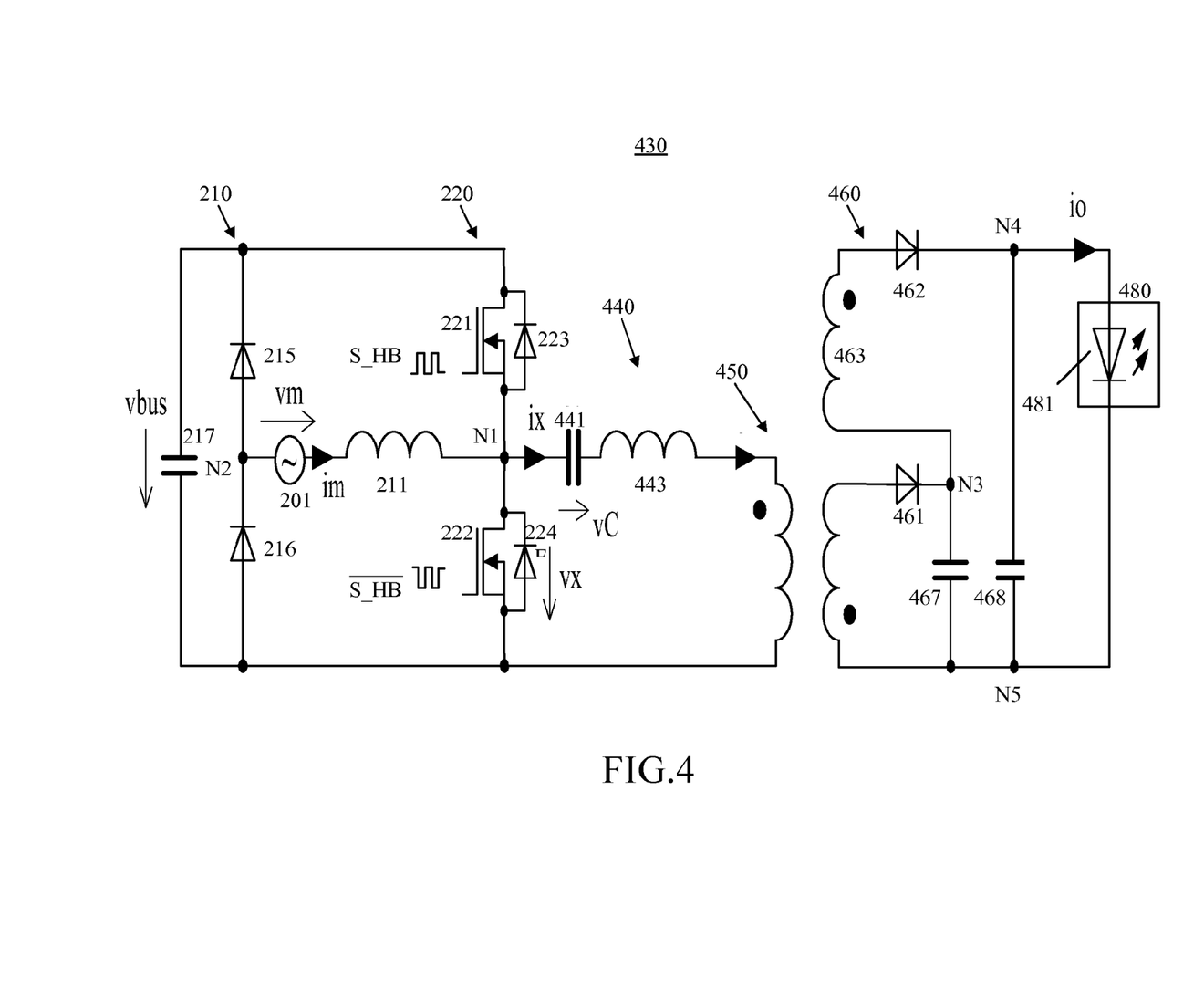
FIG. 4 illustrates a circuit diagram of a power train in a power converter, including a half-bridge inverter, according to another representative embodiment.

The power converter 110 is an integrated half-bridge converter, according to a representative embodiment, including power train 130 and associated control circuit 150. The control circuit 150 is configured to receive the mains voltage vm from the mains power supply 101, as well as various voltage and current signals M measured at the power train 130. The control circuit 150 generates a half-bridge control signal S_HB for controlling the power train 130 based on the mains voltage vm and the measured signals M. In various embodiments, the power train 130 includes a half-bridge inverter that receives the half-bridge control signal S_HB, a resonant converter and a transformer, for example. The power train 130 thus provides output power to the solid state lighting load 180 responsive to the half-bridge control signal S_HB. FIGS. 2 and 4 show illustrative configurations of power trains (e.g., the power train 130), and FIG. 3 is a block diagram of an illustrative configuration of a control circuit (e.g., control circuit 150), according to representative embodiments.

Referring to FIG. 2, power train 230 of a power converter includes power circuit 210, half-bridge inverter 220, resonant converter 240, transformer 250 and output circuit 260 for providing power to solid state lighting load 280, depicted by representative LED light source 281. The half-bridge inverter 220 is connected between the power circuit 210 and the resonant converter 240. The half-bridge inverter 220 includes first and second switches 221 and 222, which may be field effect transistors (FETs), for example, such as metal-oxide semiconductor field effect transistors (MOSFETs), which include functionality of first and second switch diodes 223 and 224, respectively. Of course, other types of switching devices may be incorporated without departing from the scope of the present teachings. The first switch 221 is controlled by half-bridge control signal S_HB and the second switch 222 is controlled by another half-bridge control signal which is effectively the inverse (complement) of the half-bridge control signal S_HB. The half-bridge control signal S_HB is generated by a controller (not shown in FIG. 2), such as control circuit 350 discussed below with reference to FIG. 3.

The power circuit 210 includes boost inductor 211 connected in series between the mains power supply 201 and node N1 between the first and second switches 221 and 222 of the half-bridge inverter 220. The power circuit 210 also includes boost rectifiers 215 and 216, which are connected in parallel with bus capacitor 217. The mains power supply 201 is connected between the boost inductor 211 and node N2, located between the boost rectifiers 215 and 216. The mains power supply 201 provides mains voltage vm and mains input current im through the boost inductor 211. The mains power supply 201 may also include mains filter components (not shown). Bus capacitor 217 is connected in parallel with the boost rectifiers 215 and 216, and bus voltage vb is the voltage across the bus capacitor 217.

By operation of the first and second switches 221 and 222 in response to the half-bridge control signal S_HB, the half-bridge inverter 220 provides a rectified, pulsed voltage signal vx input to the resonant converter 240 at input node N1 based on the bus voltage vb. The pulsed voltage signal vx may be a pulse width modulated (PWM) signal, for example, having a duty cycle and a pulse frequency set by operation of the first and second switches 221 and 222. The half-bridge inverter 220 thus functions as an integrated mains rectifier, a boost or buck-boost inverter and an output stage inverter, where the output stage effectively includes the resonant converter 240, the transformer 250 and the output circuit 260. The half-bridge inverter 220 also enables PFC through operation of the first and second switches 221 and 222 in response to the half-bridge control signal S_HB.

The resonant converter 240 is connected between node N1 of the half-bridge inverter 220 and a primary side of the transformer 250. In the depicted embodiment, the resonant converter 240 is an L(L)CC converter, including first capacitor 241, second capacitor 242 and inductor 243. The first capacitor 241 and the inductor 243 are connected in series between node N1 and the primary side of the transformer 250. The second capacitor 242 is connected in parallel with the primary side of the transformer 250. The first capacitor 241 provides capacitor voltage vC resulting from the pulsed voltage signal vx. The resonant converter 240 effectively converts the pulsed voltage signal vx output by the half-bridge inverter 220 to a sinusoidal voltage signal provided to the transformer 250.

On the secondary side of the transformer 250, the output circuit 260 includes rectifying diodes 261 and 262, and optionally inductors 263 and 264. The rectifying diode 261 and the inductor 263 are connected in series between node N3 (at the secondary side of the transformer 240) and node N4. The rectifying diode 262 is connected between the secondary side and node N4. The inductor 264 and solid state lighting load 280 are connected in series between node N4 and node N3. The solid state lighting load 280 thereby receives output current io from the power train 230 via the inductor 264.

FIG. 3 illustrates a block diagram of a control circuit of a power converter, such as control circuit 150 shown in FIG. 1, according to a representative embodiment.

Referring to FIG. 3, control circuit 350 generates half-bridge control signal S_HB for controlling power train 330, such as illustrative power train 230 shown in FIG. 2, based on input mains voltage vm received from mains power supply 301 and feedback signals from the power train 330. In particular, the control circuit 350 receives bus voltage vb, mains current im, capacitor voltage vC and output current io from the power train 330, which correspond to the bus voltage vb, mains current im, capacitor voltage vC and output current io depicted in the power train 230 in FIG. 2, for example, and therefore the description of these feedback signals will not be repeated.

In the depicted embodiment, the control circuit 350 includes signal generator circuit 320, also referred to as the state variable watching circuit, which generates the half-bridge control signal S_HB. The signal generator circuit 320 includes adder 321, subtractor 322, first and second comparators 323, 324, first and second monoflops 325, 326, cycle skipping enable OR gate 327, restart OR gate 328 and flip-flop 329.

The signal generator circuit 320 has three inputs. The first input receives a first threshold signal via an inner control loop, shown as integrated differential error signal $\Delta vCsw$. In particular, subtractor 341 subtracts the output current io measured at the power train 330 from a predetermined reference output current ioref, and provides output current error signal $\Delta io$. The reference output current ioref is determined by a dimming control signal for example. The output current error signal $\Delta io$ is processed, e.g., by means of proportional-integrator 343, which is configured to control error signal $\Delta io$ to become zero, to provide the integrated differential error signal $\Delta vCsw$.

The second input of the signal generator circuit 320 receives a second threshold signal via an outer control loop, shown as integrated error signal vC0sw, which is based on the difference between average capacitor voltage vC0 and a reference capacitor voltage vC0ref. The average capacitor voltage vC0 is obtained by filtering the capacitor voltage vC measured at the power train 330 using low pass (LP) filter 346, for example. The reference capacitor voltage vC0ref is determined by second multiplier 372 based, in part, on the difference between the mains input current im and a reference mains input current imref, which provides input current error signal $\Delta im$, as discussed below. Subtractor 342 subtracts the average capacitor voltage vC0 from the reference capacitor voltage vC0ref, and provides capacitor voltage error signal $\Delta vC0$. The capacitor voltage error signal $\Delta vC0$ is processed, e.g., by means of proportional-integrator 344 to provide the integrated error signal vC0sw. The third input of the signal generator circuit 320 receives the capacitor voltage vC measured at the power train 330.

The adder 321 of the signal generator circuit 320 adds the integrated differential error signal $\Delta vCsw$ and the integrated error signal vC0sw, and the subtractor 322 of the signal generator circuit 320 subtracts the integrated differential error signal ΔvCsw from the integrated error signal vC0sw, to detect zero crossings of the mains voltage vm. Thus, the adder 321 and the subtractor 322 provide quasi-static thresholds vCoff and vCon, respectively. The first comparator 323 compares the capacitor voltage vC (positive input) to vCoff (negative input), and outputs comparison result off0 to the first monoflop 325, and the second comparator 324 compares the capacitor voltage vC (negative input) and vCon (positive input), and outputs comparison result on0 to the second monoflop 326. The first and second monoflops 325 and 326 are triggered by the comparison results off0 and on0, respectively, thus reducing noise during detection of zero crossings.

The OR gate 327 receives output off1 from the first monoflop 325 and a cycle skipping enable signal En from timer block Toff 375, as discussed below, and provides output off1 to the reset input R of the RS flip-flop 329. For example, the OR gate 327 outputs a one and the RS flip-flop 329 is reset when at least one of the output off1 from the first monoflop 325 or the cycle skipping enable signal En from the timer block Toff 375 is high. Meanwhile, The OR gate 328 receives output on1 from the second monoflop 326 and a Restart signal Rst from monoflop 376, as discussed below, and provides output on2 to the set input S of the RS flip-flop 329. For example, the OR gate 328 outputs a one and the RS flip-flop 329 is set (or re-set) when at least one of the output on1 from the second monoflop 326 or the Restart signal Rst from the monoflop 376 is high.

The output of the RS flip-flop 329 is a square wave, the period or duty cycle of which is variable, as determined by the outputs on2 and off2, the cycle skipping enable signal En and the Restart signal Rst. The output of the RS flip-flop 329 is provided to XOR gate 379, along with a signal representing the sign of the mains voltage vm, which is a logic gate configured to perform an exclusive OR operation, to provide the half-bridge control signal S_HB for controlling power train 330. The XOR gate 379 thus provides duty cycle toggling, such that the output of the RS flip-flop 329 is inverted at positive signs of the mains voltage vm for the half-bridge control signal S_HB. Thus, the crossings of the capacitor voltage vC with thresholds vCon and vCoff set and reset the RS flip-flop 329, via the first and second monoflops 325, 326, the OR gate 327 and the OR gate 328, resulting in generation of the half-bridge control signal S_HB.

As stated above, the control circuit 350 performs a skipping operation, in which it controls the half-bridge switching of the power train 330 to be periodically interrupted, skipping one or more periods of the switching duty cycle. The skipping operation causes the half-bridge control signal S_HB to remain in either the low state or the high state via the enable signal En and the restart signal Rst, depending on the sign of the mains half cycle of the mains voltage vm. The enable signal En and the restart signal Rst are generated in response to internal reference duty cycle signal drefx in the outer control loop, the determination of which is based on the mains voltage vm, the mains current im, and the bus voltage vb.

More particularly, the mains voltage vm and the bus voltage vb (or a bus voltage signal derived from the bus voltage vb, also indicated by vb) are provided to first multiplier 371. For example, the first multiplier 371 may receive the mains voltage vm and an error signal, derived from the bus voltage vb and a predetermined bus voltage set point vb0 (not shown). In response, the first multiplier 371 determines a dynamic mains current reference signal imref. Subtractor 373 subtracts the mains current im from the mains current reference signal imref output by the first multiplier 371 to provide the input current error signal Δim. The input current error signal Δim is processed, e.g., by means of proportional-integrator 374 to provide the internal reference duty cycle signal drefx, discussed above.

In order to operate the power train 330 at or near unity power factor (PF=1), the mains current im has to be proportional to the mains voltage vm. Therefore, the mains current reference signal imref is not a constant, but rather follows the mains voltage vm, and is feedback controlled using the internal reference duty cycle signal drefx as a manipulating variable. Of course, alternative means for determining the mains current reference signal imref and evaluating the mains current im for unity (or near unity) power factor may be incorporated without departing from the scope of the present teachings.

In addition, the mains voltage vm and the bus voltage vb (or a bus voltage signal derived from the bus voltage vb, also indicated by vb) are likewise provided to second multiplier 372, along with feedback reference duty cycle signal dref0. In response, the second multiplier 372 determines the reference capacitor voltage vC0ref, which is provided to the subtractor 342. As discussed above, the subtractor 342 subtracts the average capacitor voltage vC0 from the reference capacitor voltage vC0ref to provide the integrated error signal vC0sw to the second input of the signal generator circuit 320 via the proportional-integrator 344.

The feedback reference duty cycle signal dref0 is generated by limiter circuit 377 based on the internal reference duty cycle signal drefx output by the proportional-integrator 374. The limiter circuit 377 outputs duty cycle signal dref0 as equal to internal reference duty cycle signal drefx when the internal reference duty cycle signal drefx lies within preset limits. However, when the internal reference duty cycle signal drefx exceeds or falls short of a limit, the duty cycle signal dref0 is clamped to that limit. Accordingly, the second multiplier 372 determines the reference capacitor voltage vC0ref, as follows:

$$vC0ref = vb*dref0 \text{ (at negative values of mains voltage } vm\text{); and}$$

$$vC0ref = vb*(1-dref0) \text{ (at positive values of mains voltage } vm\text{).}$$

Meanwhile, the timer block Toff 375 receives the internal reference duty cycle signal drefx output by the proportional-integrator 374 and flag x output by the limiter circuit 377, discussed below.

Generally, under normal conditions, the feedback reference duty cycle signal dref0 equals the internal reference duty cycle signal drefx. Normal conditions occur when the output power of the solid state lighting load, e.g., solid state lighting load 280, is in a preset range, including full load. Within this output power range, the internal reference duty cycle signal drefx is expected to be within certain preset upper (or lower) limit. At light loads or no load, such as during dimming operations of the solid state lighting load 280, the internal reference duty cycle signal drefx is clamped by the limiter circuit 377 to the preset value to prevent it from exceeding the upper (or lower) limit. In this case, flag x is set to 1, enabling the timer block Toff 375 to reset the RS flip-flop 329 of the signal generator circuit 320 via the enable signal En. By resetting the RS flip-flop 329, the inverter switching is periodically disabled. Then, the internal reference duty cycle signal drefx controls the duty cycle of the timer block Toff 375 interruption, for example, using the off-period as a manipulating value with the on-period as a fixed value. The internal reference duty cycle signal drefx forms the resulting (effective) duty cycle: drefx=dref0*dToff, where dToff is the duty cycle of the cycle skipping operation. Of course, the duty cycle of the timer Toff 375 interruption may be implemented by alternative means, such as fixed frequency or fixed off period, without departing from the scope of the present teachings.

In the depicted embodiment, the proportional-integrator 344 receives the inverse of the enable signal En from the timer Toff 375. Thus, during off-periods (e.g., when the reset of the RS flip-flop 329 is kept high by the enable signal En), the proportional-integrator 344, which receives the capacitor voltage difference signal $\Delta vC0$, is disabled to avoid runaway of the integrated error signal $vC0sw$. The monoflop 376 restarts the inverter switching after each off-period, e.g., by providing a high signal to the RS flip-flop 329 via the restart gate 328.

Accordingly, the half-bridge switching is periodically interrupted and the half-bridge control signal S_HB stays in either the low or high state in accordance with the skipping operation, depending on the half cycle of the main voltage vm. The interruption time (or cycle skipping time) is controlled in response to the internal reference duty cycle signal drefx, for example, when the internal reference duty cycle signal drefx exceeds a preset upper (or lower) limit, e.g., as a result of light load operation settings. As stated above, the skipping operation is periodic, and therefore has a skipping operation duty cycle that is effectively superimposed on the switching duty cycle.

In various alternative embodiments, other control implementations may be used. For example, in a light load mode, the on-time of the modulator may be specifically controlled. Also, if there is no explicit reference output current ioref (e.g., no DALI, DMX, 0-10V), the reference output current ioref may be set to a preset value or, in connection with wall plug dimmers, for example, the reference output current ioref may be determined from a dimmer phase angle (i.e., the level of dimming) applied by a dimmer.

As stated above, the control circuit 350 is not limited in the type of power train 330 to which it provides the half-bridge control signal S_HB, as long as the bus voltage vb, the mains input current im, the capacitor voltage vC and the output current io of the power train 330 may be measured. For example, FIG. 4 illustrates a circuit diagram of a power train in a power converter, including a half-bridge inverter, according to another representative embodiment.

Referring to FIG. 4, power train 430 of a power converter includes power circuit 210 and half-bridge inverter 220, which are substantially the same as discussed above with reference to FIG. 2, and therefore the descriptions will not be repeated. The power train 430 further includes resonant converter 440, transformer 450 and output circuit 460 for providing power to solid state lighting load 480, depicted by representative LED light source 481.

The resonant converter 440 is connected between node N1 of the half-bridge inverter 220 and a primary side of the transformer 450. In the depicted embodiment, the resonant converter 440 is an LLC converter, including capacitor 441 and inductor 443, which are connected in series between node N1 and the primary side of the transformer 450. The capacitor 441 provides capacitor voltage vC resulting from the pulsed voltage signal vx. The resonant converter 440 effectively converts the pulsed voltage signal vx output by the half-bridge inverter 220 to a sinusoidal voltage signal provided to the transformer 450.

On the secondary side of the transformer 450, the output circuit 460 includes rectifying diodes 461 and 462, inductor 463, and capacitors 467 and 468. The rectifying diode 461 is connected between the secondary side of the transformer 440 and node N3. The inductor 463 and the rectifying diode 462 are connected in series between node N3 and node N4, which corresponds to the input of the solid state lighting load 480. The capacitor 467 is connected between node N3 and node N5, and the capacitor 468 is connected between node N4 and node N5. The solid state lighting load 480 is also connected between node N4 and node N5 in parallel with the capacitor 468, and thereby receives output current io from the power train 430 via the rectifying diode 462.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited. Also, reference numerals and other symbols appearing in the claims in parentheses are provided merely for convenience and should not be construed as limiting the claims in any way.

The invention claimed is:

1. A power converter device for converting power from a mains power supply to power a solid state lighting load, the device comprising:
   a converter comprising a half-bridge inverter that functions as a boost inverter and output stage inverter of an output stage, the half-bridge inverter comprising a plurality of switches and the output stage comprising a resonant capacitor; and
   a control circuit configured to control a mains input current and an output current of the device independently by providing a switching signal to the plurality of switches in the half-bridge inverter, the switching signal having a duty cycle, a frequency and a cycle skipping duty cycle, wherein the control circuit is further configured to provide the switching signal using first and second threshold signals, wherein the second threshold signal is based on a difference between a capacitor voltage measured at the resonant capacitor and a reference capacitor voltage.

2. The device of claim 1, wherein the first threshold signal is based on a difference between the output current and a reference output current.

3. The device of claim 2, wherein the reference capacitor voltage is determined from a measured mains voltage, a measured bus voltage and a reference duty cycle signal derived from a difference between a measured mains input current and a reference mains input current.

4. The device of claim 2, wherein the control circuit comprises a state variable watching circuit configured to generate the switching signal by comparing state variables with the first and second threshold signals, respectively, to implement a skipping operation.

5. The device of claim 4, wherein the state variable watching circuit comprises:
a first comparator configured to compare a sum of the first and second threshold signals with the capacitor voltage to provide an Off signal;
a second comparator configured to compare a difference between the first and second threshold signals with the capacitor voltage to provide an On signal; and
a flip-flop configured to generate the switching signal based on the Off signal from the first comparator and the On signal from the second comparator.

6. The device of claim 5, wherein flip-flop is further configured to generate the switching signal based on an enable signal and a restart signal derived from the reference duty cycle signal.

7. The device of claim 6, wherein the enable signal and the Off signal indicate an end of a pulse of the switching signal, and the restart signal and the On signal indicate a beginning a pulse of the switching signal.

8. The device of claim 7, wherein the control circuit further comprises a logic gate configured to perform an exclusive OR operation on an output of the flip-flop and a signal representing a sign of the measured mains voltage, thereby inverting the output of the flip-flop at positive signs of the measured mains voltage to provide the switching signal, such that the half-bridge inverter further functions as an integrated mains rectifier.

9. The power converter of claim 2, wherein the control circuit comprises:
a signal generator circuit configured to receive the first and the second threshold signals;
a timer block configured to provide an enable signal in response to an internal reference duty cycle signal, which is based on a difference between a mains input current and a reference mains input current; and
a monoflop configured to provide a restart signal in response to the enable signal, wherein the enable signal and the restart signal cause the signal generator circuit to selectively interrupt the duty cycle in accordance with the cycle skipping duty cycle.

10. The device of claim 9, wherein the signal generator circuit comprises:
a first comparator configured to compare the capacitor voltage with a sum of the first and second threshold signals, and to output a first comparison result;
a second comparator configured to compare the capacitor voltage with a difference between the first and second threshold signals, and to output a second comparison result;
a first logic gate configured to receive the first comparison result and the enable signal, and to output an Off signal logic result;
a second logic gate configured to receive the second comparison result and the restart signal, and to output an On signal logic result; and
a flip-flop configured to generate the switching signal in response to the Off signal logic result and the On signal logic result.

11. The device of claim 10, wherein the flip-flop comprises a reset-set (RS) flip-flop, wherein the Off signal logic result is input to the reset input of the RS flip-flop, the On signal logic result is input to the set input of the RS flip-flop, and the switching signal is output from an output of the RS flip-flop.

12. The device of claim 11, wherein each of the first and second logic gate comprise an OR logic gate.

13. The device of claim 9, wherein the control circuit further comprises:
a first multiplier configured to multiply a mains voltage and a bus voltage signal measured at a bus capacitor of the power converter, and to output the reference mains input current;
a subtractor configured to determine the difference between the mains input current and the reference mains input current output by the first multiplier; and
a second multiplier configured to multiply the mains voltage, the bus voltage, and a feedback reference duty cycle signal based on the difference between the mains input current and the reference mains input current determined by the subtractor, and to output the reference capacitor voltage.

14. The device of claim 13, wherein the control circuit further comprises:
a first proportional-integrator configured to integrate the difference between the reference output current and the output current to provide the first threshold signal; and
a second proportional-integrator configured to integrate the difference between the reference capacitor voltage and the capacitor voltage to provide the second threshold signal.

15. The device of claim 14, wherein the control circuit further comprises:
a third proportional-integrator configured to integrate the difference between the mains input current and the reference mains input current, and to output an internal reference duty cycle signal.

16. The device of claim 15, wherein the control circuit further comprises:
a limiter circuit configured to determine the feedback reference duty cycle signal based on the internal reference duty cycle signal output by the third proportional-integrator.

17. The device of claim 16, wherein the limiter circuit is further configured to generate a flag in response to the internal reference duty cycle signal reaching a preset value, the flag being provided to the timer block to cause the timer block to generate the enable signal, preventing the internal reference duty cycle signal from exceeding one of an upper or lower limit.

18. A power converter device for converting power from a mains power supply to power a light-emitting diode (LED)-based lighting unit, the device comprising:
a half-bridge inverter comprising a plurality of switches, and configured to function as an integrated mains rectifier and output stage, the output stage comprising a resonant capacitor and a transformer; and a control circuit configured to control a mains input current and an output current of the device independently by providing a switching signal to the plurality of switches in the half-bridge inverter, the switching signal having a duty cycle, a frequency and a cycle skipping duty cycle corresponding to a cycle skipping operation, the cycle skipping duty cycle being based on comparing a plurality of difference signals with a corresponding plurality of threshold signals, a first difference signal comprising a difference between the output current of the device and a reference output current, and a second difference signal comprising a difference between a resonant capacitor voltage and a reference capacitor voltage.

* * * * *